US012789209B2

(12) United States Patent
Senso et al.

(10) Patent No.: US 12,789,209 B2
(45) Date of Patent: Nov. 10, 2026

(54) DISCHARGE DEVICE

(71) Applicant: YOSHINO KOGYOSHO CO., LTD., Tokyo (JP)

(72) Inventors: Yoichi Senso, Tokyo (JP); Kazuhisa Yoshimura, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 260 days.

(21) Appl. No.: 18/278,760

(22) PCT Filed: Feb. 25, 2022

(86) PCT No.: PCT/JP2022/007950
§ 371 (c)(1),
(2) Date: Aug. 24, 2023

(87) PCT Pub. No.: WO2022/181775
PCT Pub. Date: Sep. 1, 2022

(65) Prior Publication Data
US 2024/0307905 A1 Sep. 19, 2024

(30) Foreign Application Priority Data
Feb. 26, 2021 (JP) ................................ 2021-030386

(51) Int. Cl.
*B05B 11/10* (2023.01)

(52) U.S. Cl.
CPC ...... *B05B 11/1077* (2023.01); *B05B 11/1023* (2023.01)

(58) Field of Classification Search
CPC ............. B05B 11/1077; B05B 11/1073; B05B 11/1042; B05B 11/10; B05B 11/1001; B05B 11/1023

(Continued)

(56) References Cited

U.S. PATENT DOCUMENTS 5,238,156 A * 8/1993 Andris ................ B05B 11/1074 222/207
7,410,079 B2 * 8/2008 Kuwahara ........... B05B 11/1077 222/321.2

(Continued)

FOREIGN PATENT DOCUMENTS

CN 202591008 U 12/2012
CN 103420022 A 12/2013

(Continued)

OTHER PUBLICATIONS

Jan. 14, 2025 Office Action issued in Japanese Patent Application No. 2021-030386.

(Continued)

*Primary Examiner* — David P Angwin
(74) *Attorney, Agent, or Firm* — Oliff PLC

(57) ABSTRACT

A discharge device includes a stem disposed inside a mouth portion of a container body to be movable downward in an upward biased state, a tubular cylinder into which the stem is inserted, a piston linked to vertical movement of the stem within the cylinder and fitted to an inner peripheral surface of the cylinder to be vertically slidable, a biasing member made of a synthetic resin that surrounds the stem from an outside in a radial direction and is mounted on an upper portion of the stem, the biasing member being configured to bias the stem upward, and a push-down head mounted on an upper end portion of the stem and provided with a nozzle hole for discharging a content fluid.

4 Claims, 6 Drawing Sheets

(58) Field of Classification Search
USPC ........................................... 222/321.7–321.9
See application file for complete search history.

(56) References Cited

U.S. PATENT DOCUMENTS

| | | | | |
|---|---|---|---|---|
| 8,875,954 | B2 * | 11/2014 | Carta | B05B 11/1074 222/321.2 |
| 2003/0116588 | A1 * | 6/2003 | Santagiuliana | B05B 11/1007 222/321.9 |
| 2015/0136810 | A1 * | 5/2015 | Ding | B05B 11/1074 222/321.9 |
| 2019/0054486 | A1 | 2/2019 | Deman et al. | |
| 2020/0307864 | A1 | 10/2020 | Lim | |
| 2022/0048058 | A1 | 2/2022 | Goettke et al. | |

FOREIGN PATENT DOCUMENTS

| | | | |
|---|---|---|---|
| CN | 111232419 | A | 6/2020 |
| CN | 111480963 | A | 8/2020 |
| DE | 102019132343 | A1 | 7/2020 |
| JP | H10-059404 | A | 3/1998 |
| JP | H10-071349 | A | 3/1998 |
| JP | H10-076196 | A | 3/1998 |
| JP | H10-235242 | A | 9/1998 |
| JP | H10-263445 | A | 10/1998 |
| JP | 2000-015148 | A | 1/2000 |
| JP | 2002-273278 | A | 9/2002 |
| JP | 2016-123927 | A | 7/2016 |
| JP | 2017-178442 | A | 10/2017 |
| JP | 2019-189298 | A | 10/2019 |
| JP | 2020-163118 | A | 10/2020 |
| JP | 2021-008293 | A | 1/2021 |
| WO | 2020/090993 | A1 | 5/2020 |

OTHER PUBLICATIONS

Aug. 27, 2024 Office Action issued in Japanese Patent Application No. 2021-030386.
Dec. 20, 2024 extended Search Report issued in European Patent Application No. 22759809.1.
Apr. 19, 2022 International Search Report issued in International Patent Application No. PCT/JP2022/007950.
Jul. 16, 2025 Office Action issued in Chinese Patent Application No. 202280016952.5 (with partial translation).

* cited by examiner

DISCHARGE DEVICE

TECHNICAL FIELD

The present invention relates to a discharge device. Priority is claimed on Japanese Patent Application No. 2021-030386, filed Feb. 26, 2021, the content of which is incorporated herein by reference.

BACKGROUND ART

Conventionally, for example, as shown in Patent Document 1 below, a discharge device including a stem disposed inside a mouth portion of a container body to be movable downward in an upwardly biased state, a tubular cylinder into which the stem is inserted, a piston linked to vertical movement of the stem within the cylinder and fitted to an inner peripheral surface of the cylinder to be vertically slidable, and a push-down head mounted on an upper end portion of the stem and having a nozzle hole for discharging a content fluid is known.

In general, a biasing member that biases the stem upward is made of a metal material.

CITATION LIST

Patent Document

[Patent Document 1]
Japanese Unexamined Patent Application, First Publication No. 2016-123927

SUMMARY OF INVENTION

Technical Problem

However, from the viewpoint of reducing an environmental load and facilitating disposal by a user, the discharge device is required not to use a biasing member made of a metal material.

The present invention has been made in view of such circumstances, and an object thereof is to provide a discharge device capable of reducing an environmental load and facilitating disposal by a user.

Solution to Problem

A first aspect of the present invention is a discharge device including a stem disposed inside a mouth portion of a container body to be movable downward in an upward biased state, a tubular cylinder into which the stem is inserted, a piston linked to vertical movement of the stem within the cylinder and fitted to an inner peripheral surface of the cylinder to be vertically slidable, a biasing member made of a synthetic resin that surrounds the stem from an outside in a radial direction and is mounted on an upper portion of the stem, the biasing member being configured to bias the stem upward, and a push-down head mounted on an upper end portion of the stem and provided with a nozzle hole for discharging a content fluid.

In the discharge device, when the push-down head is pushed down and the stem and the piston are moved down, the biasing member is elastically compressed and deformed in the vertical direction as the stem moves down. When the pushing-down of the push-down head is released, the biasing member is restored and deformed, and the stem, the piston and the push-down head can be pushed up. At this time, since the biasing member is mounted on the stem, the stem is reliably restored and displaced upward as the biasing member is restored and displaced. Therefore, for example, occurrence of a problem such as the stem that has moved down being not restored and displaced upward can be curbed.

Since the biasing member is made of a synthetic resin material, an environmental load can be reduced. Furthermore, for example, a discharge device in which all members are made of a synthetic resin material can be realized. As a result, in disposal of the discharge device, it is possible to eliminate the need to separate the biasing member from other members made of a synthetic resin material. Therefore, facilitation of disposal by a user can be realized.

The biasing member is mounted on the upper portion of the stem. Therefore, for example, when the stem is pushed down, it is possible to curb only the stem being lowered into the cylinder without the biasing member being pushed down.

A second aspect of the present invention is the discharge device according to the first aspect in which at least the stem, the cylinder, the piston and the biasing member constitute a pump module, and the push-down head is mounted on the upper end portion of the stem in the pump module.

The push-down head is mounted on the upper end portion of the stem in the pump module. Therefore, for example, when the discharge device is applied to a plurality of products of different types, the pump module can be used in common while the push-down head and the like can be appropriately changed according to the product.

A third aspect of the present invention is the discharge device according to the second aspect in which a piston retainer made of a synthetic resin and provided at an upper end portion of the cylinder is further provided, and the biasing member is integrally formed with the piston retainer and extends upward from the piston retainer.

The biasing member is integrally formed with the piston retainer. That is, the biasing member and the piston retainer are formed by one molding. Therefore, an increase in the number of parts can be curbed, and the discharge device can be easily assembled.

Advantageous Effects of Invention

According to the present invention, it is possible to realize facilitation of disposal by a user while an environmental load is reduced.

DESCRIPTION OF EMBODIMENTS

First Embodiment

A first embodiment of a discharge device according to the present invention will be described below with reference to the drawings.

Figure 1:
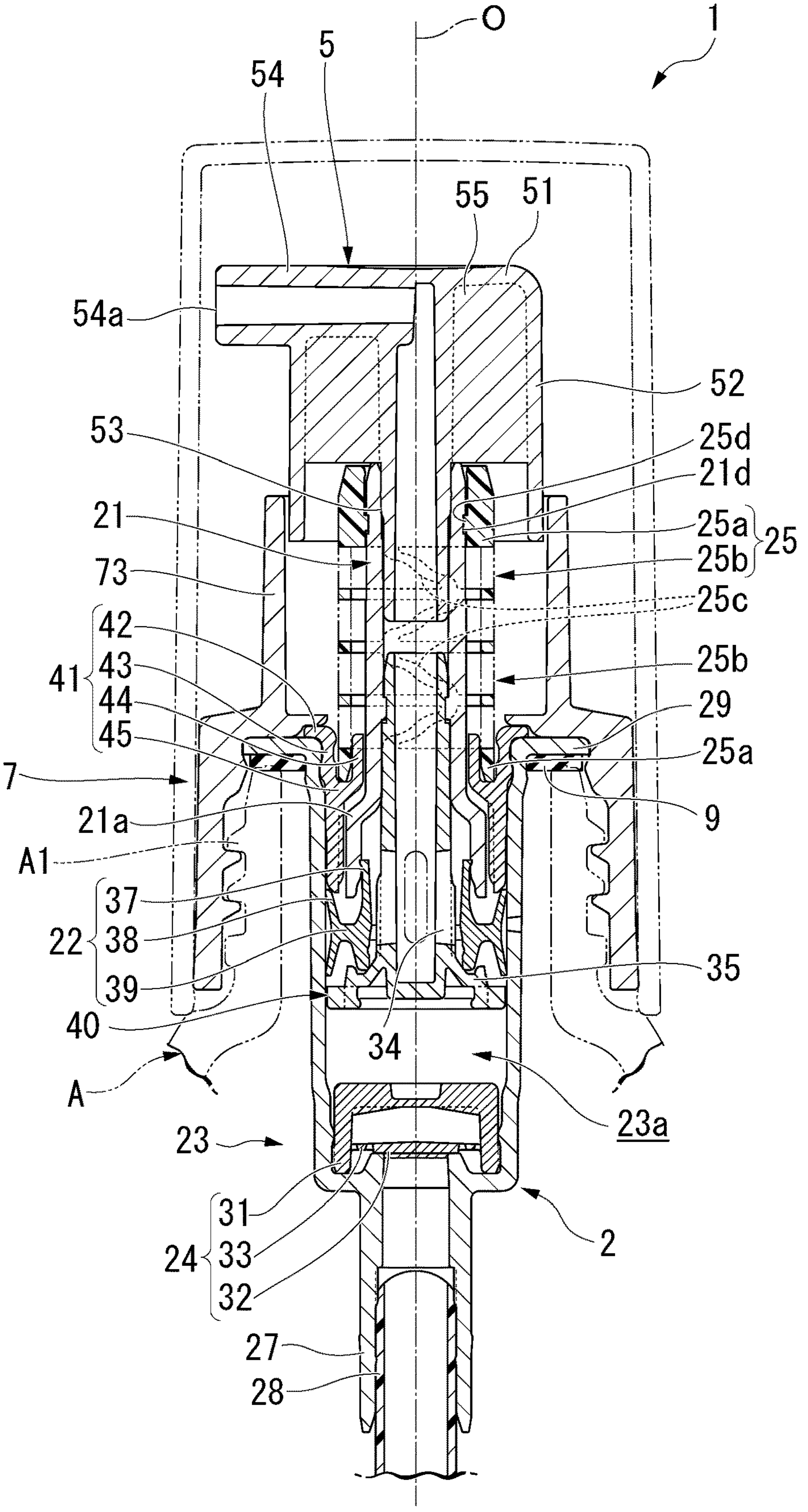
FIG. 1 is a longitudinal cross-sectional view of a discharge device according to a first embodiment of the present invention.
Figure 2:
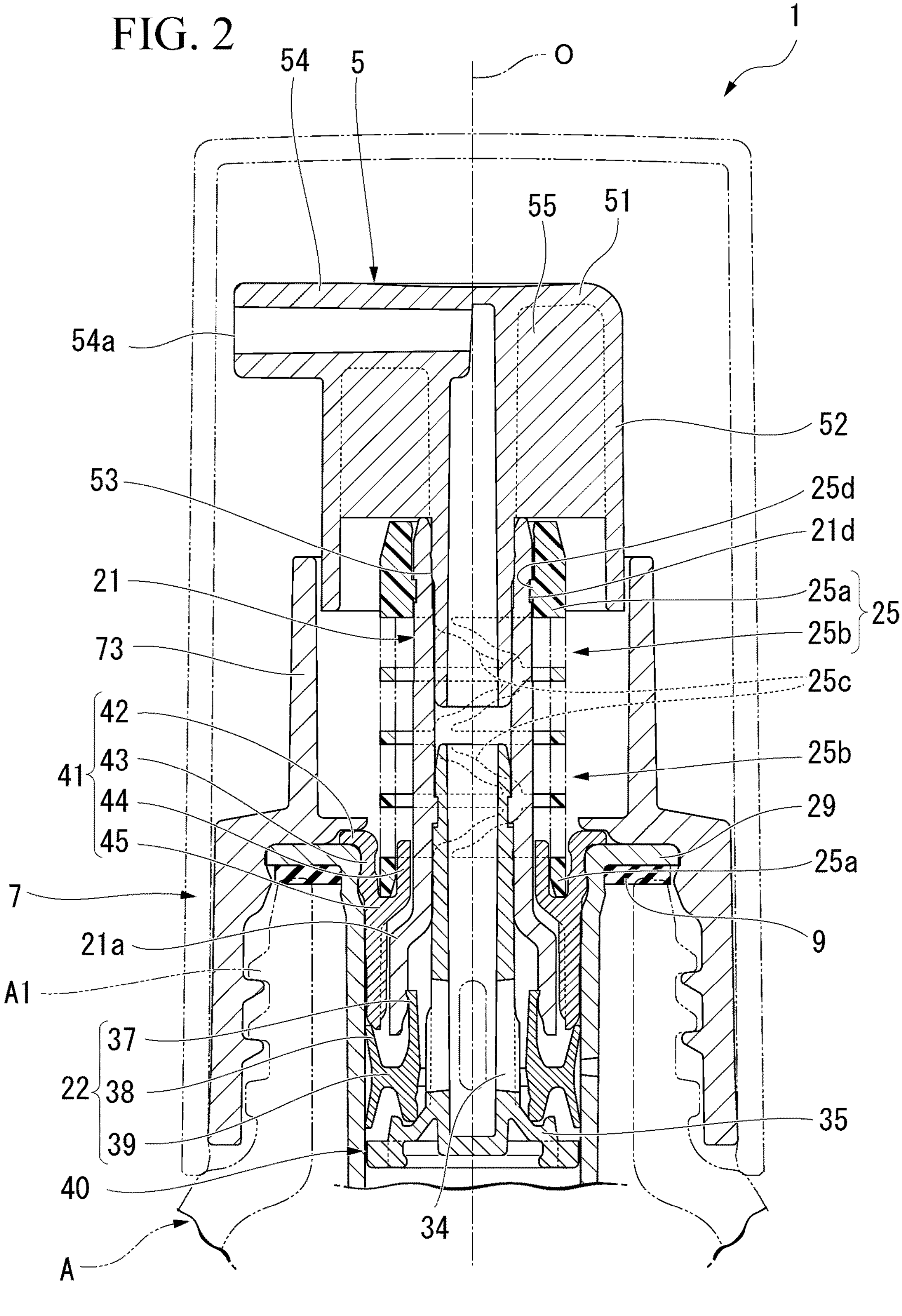
FIG. 2 is a longitudinal cross-sectional view of a main part of the discharge device shown in FIG. 1.
Figure 3:
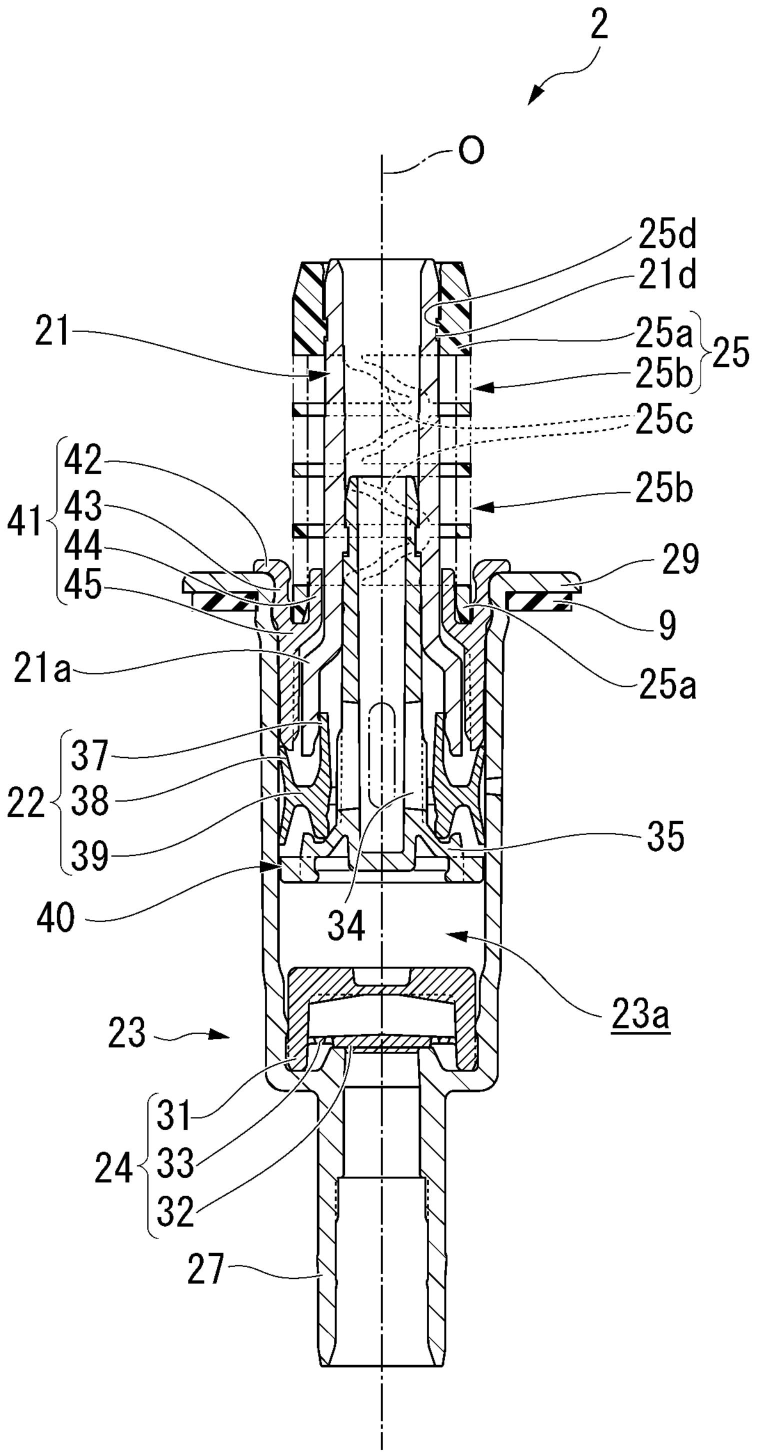
FIG. 3 is a longitudinal cross-sectional view of a pump module that constitutes the discharge device shown in FIG. 1.

As shown in FIGS. 1 to 3, the discharge device of the present embodiment includes a pump module 2 having a stem 21, a push-down head 5 mounted on the stem 21, and a mounting cap 7 for mounting the pump module 2 to a mouth portion A1 of a container body A containing a content fluid.

All the components constituting the discharge device 1 are made of a synthetic resin material.

The stem 21 and the mounting cap 7 are disposed coaxially with a common axis. Hereinafter, this common axis will be referred to as a central axis O along which the push-down head 5 side will be referred to as the upper side, and the bottom side (not shown) of the container body A will be referred to as the lower side. Further, a direction along the central axis O is called a vertical direction, a direction intersecting the central axis O as seen in the vertical direction is called a radial direction, and a direction around the central axis O is called a circumferential direction.

The container body A is formed to have a tubular shape with a bottom, and a male thread is formed on an outer peripheral surface of the mouth portion A1. The container body A is disposed coaxially with the central axis O.

The mounting cap 7 is formed to have a tubular shape with a top having an annular top wall and a peripheral wall. The stem 21 is inserted inside the top wall of the mounting cap 7 to be vertically movable. A female thread is formed on an inner peripheral surface of the peripheral wall of the mounting cap 7 to be threaded to the male thread of the mouth portion A1. In addition, the peripheral wall of the mounting cap 7 may be, for example, undercut-fitted to the mouth portion A1. The mounting cap 7 further includes a guide tube 73 that protrudes upward from the top wall. The guide tube 73 is disposed coaxially with the central axis O).

The pump module 2 has a stem 21, a piston guide 40, a piston 22, a cylinder 23, a lower valve body 24, a packing 9 and a biasing member 25.

The cylinder 23 is formed to have a tubular shape with a bottom having an annular bottom wall and a peripheral wall, and is disposed coaxially with the central axis O. A mounting tube 27 extending downward is provided on an inner peripheral edge portion of the bottom wall of the cylinder 23. An upper end portion of a suction tube 28 (a pipe) is fitted to the mounting tube 27. A lower end opening of the suction tube 28 is located inside the bottom of the container body A (not shown).

A fixed flange portion 29 that protrudes radially outward and extends in the circumferential direction is formed at an upper end portion of the peripheral wall of the cylinder 23. The fixed flange portion 29 is disposed at an upper opening edge of the mouth portion A1 of the container body A with the packing 9 interposed therebetween. A lower surface of the top wall of the mounting cap 7 is disposed on an upper surface of the fixed flange portion 29. The lower valve body 24 is provided in a lower end portion of the peripheral wall of the cylinder 23.

The lower valve body 24 includes a fitting tube 31, a valve body 32 and a connecting piece 33.

The fitting tube 31 is fitted inside the lower end portion of the peripheral wall of the cylinder 23. The valve body 32 is formed to have a plate shape and is seated on a opening peripheral edge portion on an upper surface of the bottom wall of the cylinder 23 to close the inner side of the bottom wall of the cylinder 23. The valve body 32 is connected to an inner peripheral surface of the fitting tube 31 via the elastically deformable connecting piece 33. The valve body 32 is elastically displaced in the vertical direction as the connecting piece 33 is elastically deformed.

The lower valve body 24 serves as a check valve that keeps the inside of the bottom wall of the cylinder 23 closed when the inside of the cylinder 23 is pressurized, and opens the inside of the bottom wall of the cylinder 23 when the inside of the cylinder 23 is decompressed. Thus, the lower valve body 24 prevents a content fluid in the cylinder 23 from returning to the container body A through the inside of the bottom wall of the cylinder 23 when the cylinder 23 is pressurized, and also causes the content fluid in the container body A to flow into the cylinder 23 through the inside of the bottom wall of the cylinder 23 when the inside of the cylinder 23 is decompressed.

The stem 21 stands upright on the mouth portion A1 to be movable downward in an upward biased state. The stem 21 is formed to have a tubular shape. A lower end portion 21*a* of the stem 21 is accommodated within the cylinder 23. The lower end portion 21*a* of the stem 21 has a larger diameter than a portion of the stem 21 located above the lower end portion 21*a*. An upper portion of the stem 21 is located above the upper end opening of the cylinder 23.

The piston guide 40 is mounted in the stem 21 from below. The piston guide is formed to have a tubular shape with a bottom. An upper end portion of the piston guide 40 is fitted into a portion of the stem 21 located above the lower end portion 21*a*. A communication hole 34 is formed in the piston guide 40 to pass therethrough in the radial direction. A pedestal portion 35 protruding radially outward is formed in the piston guide 40. The pedestal portion 35 is formed in a portion of the piston guide 40 located below the communication hole 34. The pedestal portion 35 supports the piston 22 from below the piston 22.

The piston 22 has an outer tube 38, an inner tube 37 and a connecting plate 39.

The outer tube 38 is formed to have a cylindrical shape and provided coaxially with the central axis O. The outer tube 38 is fitted in the cylinder 23 to be vertically slidable. A through hole penetrating in the radial direction is formed in a portion of the cylinder 23 that faces the outer tube 38 in the radial direction.

The inner tube 37 is formed to have a cylindrical shape and provided coaxially with the central axis O. A lower end portion of the inner tube 37 is separably seated on the pedestal portion 35 of the piston guide 40. As a result, the inner tube 37 switches communication between a portion located below the piston 22 (hereinafter, referred to as a lower chamber 23*a*) in the cylinder 23 and the communication hole 34 of the piston guide 40 and disconnection thereof. Such a piston guide 40 functions as an upper valve body in the pump module 2. An upper portion of the inner tube 37 is fitted into the lower end portion 21*a* of the stem 21 to be vertically slidable. The connecting plate 39 connects an inner peripheral surface of the outer tube 38 and an outer peripheral surface of the inner tube 37 and extends continuously over the entire length in the circumferential direction. An upper surface of the connecting plate 39 faces a lower opening edge (the lower end portion 21*a*) of the stem 21 with a gap therebetween in the vertical direction.

The push-down head 5 is formed to have a tubular shape with a top having a top wall portion 51 and an outer tubular portion 52 and is disposed coaxially with the central axis O). The outer tubular portion 52 is provided radially inward with respect to the guide tube 73 of the mounting cap 7. A lower end portion of the outer tubular portion 52 is located below an upper end portion of the guide tube 73.

The push-down head 5 includes a mounting tubular portion 53 that protrudes downward from the top wall portion 51, a nozzle tubular portion 54 that extends radially outward from the mounting tubular portion 53 and passes through the outer tubular portion 52 in the radial direction, and a rib 55 that extends downward from the top wall portion 51. A nozzle hole 54*a* that opens in the radial direction is formed at a tip end of the nozzle tubular portion 54. The inside of the nozzle tubular portion 54 communicates with the inside of the mounting tubular portion 53. The mounting tubular portion 53 is disposed coaxially with the central axis O. A lower end portion of the mounting tubular portion 53 is located above a lower end portion of the outer tubular portion 52. An upper end portion of the stem 21 is fitted to the outside of the mounting tubular portion 53. The mounting tubular portion 53 is inserted into the stem 21. A radially inner end portion of the rib 55 is connected to an outer peripheral surface of the mounting tubular portion 53. A radially outer end of the rib 55 is connected to an inner peripheral surface of the outer tubular portion 52. A lower end of the rib 55 is located below a lower end of the nozzle tubular portion 54. A plurality of ribs 55 are disposed at intervals in the circumferential direction.

Here, a piston retainer 41 is provided at an upper end portion of the cylinder 23. The piston retainer 41 functions as a stopper for parts inside the cylinder 23 such as the piston 22. The stem 21 is inserted through the piston retainer 41. The piston retainer 41 is disposed coaxially with the central axis O.

The piston retainer 41 includes a plate portion 42, a first tubular portion 43, a second tubular portion 44 and a connecting portion 45. The plate portion 42 is an annular plate of which front and back surfaces face in the vertical direction. An outer peripheral portion of the plate portion 42 is disposed on the fixed flange portion 29. The outer peripheral portion of the plate portion 42 is sandwiched between the fixed flange portion 29 and the mounting cap 7 in the vertical direction. The first tubular portion 43 extends downward from an inner peripheral edge of the plate portion 42. The first tubular portion 43 is fitted inside an upper end portion of the peripheral wall of the cylinder 23. The first tubular portion 43 is disposed between the upper end portion of the peripheral wall of the cylinder 23 and the lower end portion 21*a* of the stem 21. The second tubular portion 44 is disposed inside the first tubular portion 43 in the radial direction. The second tubular portion 44 is disposed above the center of the first tubular portion 43 in the vertical direction. The second tubular portion 44 is disposed above the lower end portion 21*a* of the stem 21. The connecting portion 45 connects the first tubular portion 43 and the second tubular portion 44. The connecting portion 45 has an annular shape. The connecting portion 45 extends radially outward from the lower end of the second tubular portion 44. A radial outer edge of the connecting portion 45 is connected to the inner peripheral surface of the first tubular portion 43. An annular gap is provided between the first tubular portion 43 and the second tubular portion 44.

The biasing member 25 extends upward from the piston retainer 41. The biasing member 25 is disposed outside the cylinder 23. The biasing member 25 is formed to have a tubular shape as a whole. The biasing member 25 surrounds the stem 21 from the outside in the radial direction. The biasing member 25 is disposed inside the guide tube 73.

In the illustrated example, the biasing member 25 includes a plurality of annular bodies 25*a* and a plurality of connecting bodies 25*b*. The plurality of annular bodies 25*a* are arranged at intervals in the vertical direction. The plurality of annular bodies 25*a* are disposed coaxially with the central axis O. The annular bodies 25*a* adjacent to each other in the vertical direction are connected to each other via the connecting body 25*b*. In the embodiment, the biasing member 25 is formed by alternately arranging the annular bodies 25*a* and the connecting bodies 25*b* in the vertical direction. The connecting body 25*b* elastically connects the annular bodies 25*a* adjacent to each other in the vertical direction. Each of the connecting bodies 25*b* includes a plurality of (for example, three) spring pieces 25*c* disposed at intervals in the circumferential direction. The spring piece 25*c* is inclined with respect to the central axis O in a front view of the spring piece 25*c* seen from the outside in the radial direction. In the connecting bodies 25*b* adjacent to each other with the annular body 25*a* interposed therebetween, directions in which the spring pieces 25*c* are inclined are opposite to each other. Among the connecting bodies 25*b* adjacent to each other with the annular body 25*a* interposed therebetween, a lower end of the spring piece 25*c* in the upper connecting body 25*b* is at the same position in the circumferential direction as an upper end of the spring piece 25*c* in the lower connecting body 25*b*. The form of the biasing member 25 is not limited thereto, and it is possible to adopt the form of a known resin spring. For example, a designer may appropriately change a radial thickness of the biasing member 25.

A lower end portion of the biasing member 25 is fixed to an upper surface of the piston retainer 41. The lower end portion of the biasing member 25 is fitted into the gap between the first tubular portion 43 and the second tubular portion 44 of the piston retainer 41. In the illustrated example, the lowermost annular body 25*a* of the biasing member 25 is fitted into the gap. The lower end portion of the biasing member 25 is supported by the connecting portion 45.

The biasing member 25 is mounted on the upper portion of the stem 21. In the illustrated example, a convex portion 25*d* is provided on the upper end portion of the biasing member 25. The convex portion 25*d* is provided on the uppermost annular body 25*a* among the plurality of annular bodies 25*a*. The uppermost annular body 25*a* is larger in the vertical direction and thicker in the radial direction than the other annular bodies 25*a*. The convex portion 25*d* protrudes radially inward from the biasing member 25. A concave portion 21*d* is provided in the upper end portion of the stem 21. The concave portion 21*d* is recessed radially inward from the outer peripheral surface of the stem 21. The convex portion 25*d* is fitted in the concave portion 21*d*. The concave portion 21*d* and the convex portion 25*d* are undercut-fitted, and the convex portion 25*d* is fitted into the concave portion 21*d* so as not to be substantially displaceable in the vertical direction relative to the concave portion 21*d*. In other words, the convex portion 25*d* is fitted into the concave portion 21*d* without a margin in the vertical direction. As a result, in the embodiment, the upper end portion of the biasing member and the upper end portion of the stem 21 cannot be displaced relative to each other in the vertical direction.

The convex portion 25*d* may be fitted in the concave portion 21*d* to be displaceable in the vertical direction relative to each other. In other words, the convex portion 25*d* may be fitted into the concave portion 21*d* with a margin in the vertical direction. Such a configuration can be realized, for example, when a size of the concave portion 21*d* in the vertical direction is larger than a size of the convex portion 25*d* in the vertical direction. The size of the concave portion 21*d* in the vertical direction may be about 1 to 1.5 times the size of the convex portion 25*d* in the vertical direction. In this case, the biasing member 25 and the stem 21 can be slightly displaced relative to each other in the vertical direction.

Furthermore, in the embodiment, the upper end portion of the biasing member 25 is mounted on the upper end portion of the stem 21, but it may be modified to another form in which the biasing member 25 is mounted on the upper portion of the stem 21. For example, the upper end portion of the biasing member 25 may be mounted on a portion of the upper portion of the stem 21 that is located closer to the center than the portion that is located closer to an end in the vertical direction.

Also, in the illustrated example, an upper end surface of the biasing member 25 is separated downward from the push-down head 5 (the lower end of the rib 55), but the upper end surface of the biasing member 25 is in contact with the push-down bead 5.

Next, an operation of the above-described discharge device 1 illustrated in FIG. 1 will be described.

When the push-down head 5 is pushed down, the upper end portion of the biasing member 25 moves down in conjunction with the upper end portion of the stem 21 while the stem 21 moves down, and the biasing member 25 is elastically compressed and deformed in the vertical direction. At this time, seal between the pedestal portion 35 of the piston guide 40 and the inner tube 37 of the piston 22 is released, and the lower chamber 23*a* in the cylinder 23 and the communication hole 34 of the piston guide 40 communicate with each other. When the push-down head 5 is further pushed down from this state, the lower opening edge of the stem 21 comes into contact with the upper surface of the connecting plate 39 of the piston 22, and the piston 22 also moves down together with the push-down head 5. As a result, the lower chamber 23*a* in the cylinder 23 is pressurized, and the content fluid in the cylinder 23 passes through the gap in the vertical direction between the pedestal portion 35 and the piston 22, the communication hole 34, the inside of the stem 21, the mounting tubular portion 53, and the nozzle tubular portion 54 in this order and is discharged from the nozzle hole 54*a*. At this time, the valve body 32 of the lower valve body 24 is kept in a state in which it is seated on the opening peripheral edge portion on the upper surface of the bottom wall of the cylinder 23.

Then, when the pushing-down of the push-down head 5 is released, the push-down head 5 is restored and moved upward together with the stem 21 by an upward biasing force of the biasing member 25. In this process, the pedestal portion 35 of the piston guide 40 comes into contact with the piston 22 from below, and a space between the pedestal portion 35 and the inner tube 37 is sealed, and thus communication between the lower chamber 23*a* in the cylinder 23 and the communication hole 34 of the piston guide 40 is blocked. Then, when the piston 22 also continues to move upward together with the push-down head 5, the lower chamber 23*a* in the cylinder 23 is decompressed, and the valve body 32 of the lower valve body 24 is moved upward away from the opening peripheral edge portion on the upper surface of the bottom wall of the cylinder 23 while elastically deforming the connecting piece 33. As a result, the content fluid in the container body A flows into the cylinder 23 through the suction tube 28. When the biasing member 25 is restored and deformed, because the biasing member 25 is mounted on the stem 21, the stem 21 is securely restored and displaced upward as the biasing member 25 is restored and deformed. Therefore, for example, it is possible to curb occurrence of a problem such as the stem 21 being not restored and displaced upward.

As described above, according to the discharge device 1 of the embodiment, since the biasing member 25 is made of a synthetic resin material, an environmental load can be reduced. Furthermore, for example, it is possible to realize a discharge device 1 in which all the members are made of a synthetic resin material. As a result, in disposal of the discharge device 1, it is possible to eliminate the need to separate the biasing member 25 from other members made of a synthetic resin material. Therefore, facilitation of disposal by the user can be realized.

The biasing member 25 is mounted on the upper portion of stem 21. Therefore, for example, when the stem 21 is pushed down, it is possible to curb only the stem 21 being moved down into the cylinder 23 without the biasing member 25 being pushed down.

The push-down head 5 is mounted on the upper end portion of the stem 21 in the pump module 2. Therefore, for example, when the discharge device I is applied to a plurality of products of different types, the pump module 2 can be used in common while the push-down head 5 and the mounting cap 7 can be appropriately changed according to the product.

Second Embodiment

Figure 4:
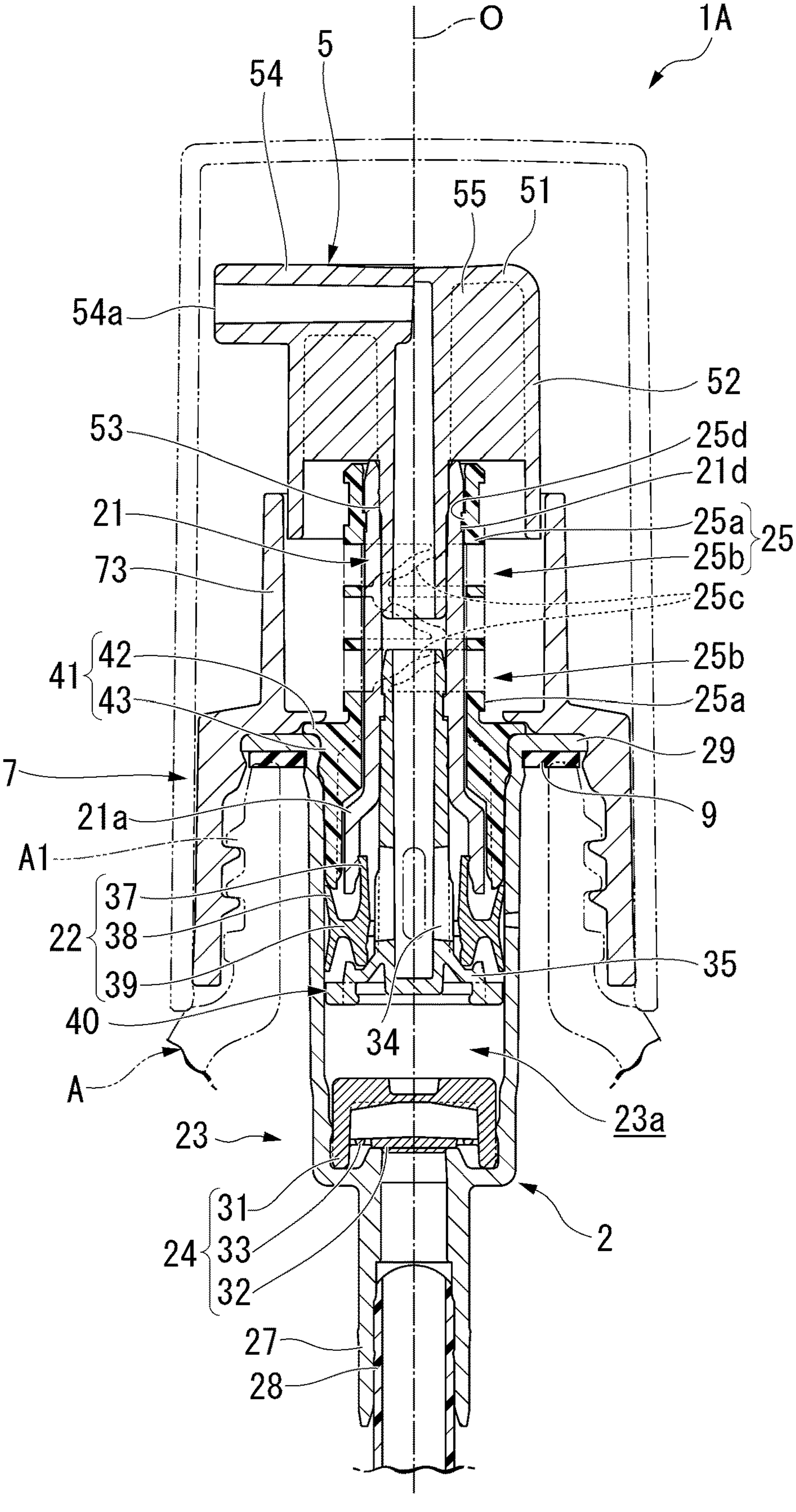
FIG. 4 is a longitudinal cross-sectional view of a discharge device according to a second embodiment of the present invention.

Next, a discharge device according to a second embodiment of the present invention will be described with reference to FIG. 4.

In the second embodiment, the same reference numerals are assigned to the same components as in the first embodiment, and the description thereof will be omitted, and only the different points will be described.

In the discharge device 1A according to the embodiment, the piston retainer 41 and the biasing member 25 are integrally formed. The piston retainer 41 and the biasing member 25 are one molded product (an injection molded product) made of a synthetic resin.

The piston retainer 41 includes the plate portion 42 and the first tubular portion 43, but does not include the second tubular portion 44 and the connecting portion 45. The biasing member 25 extends upward from the piston retainer 41. The biasing member 25 is provided on an inner peripheral edge of the plate portion 42. The biasing member 25 is disposed on the side opposite to the first tubular portion 43 with the plate portion 42 interposed therebetween in the vertical direction.

As described above, according to the discharge device IA according to the embodiment, the biasing member 25 is integrally formed with the piston retainer 41. That is, the biasing member 25 and the piston retainer 41 are formed by one molded product. Therefore, an increase in the number of parts can be curbed. Also, the biasing member 25 can be assembled to the cylinder 23 by mounting the piston retainer 41 to the upper end portion of the peripheral wall of the cylinder 23. Therefore, the discharge device 1 can be easily assembled.

The technical scope of the present invention is not limited to the above embodiments, and various modifications can be made without departing from the scope of the present invention.

The form of mounting between the biasing member 25 and the upper portion of the stem 21 is not limited to the concave-convex fitting described in the above embodiment.

Figure 5:
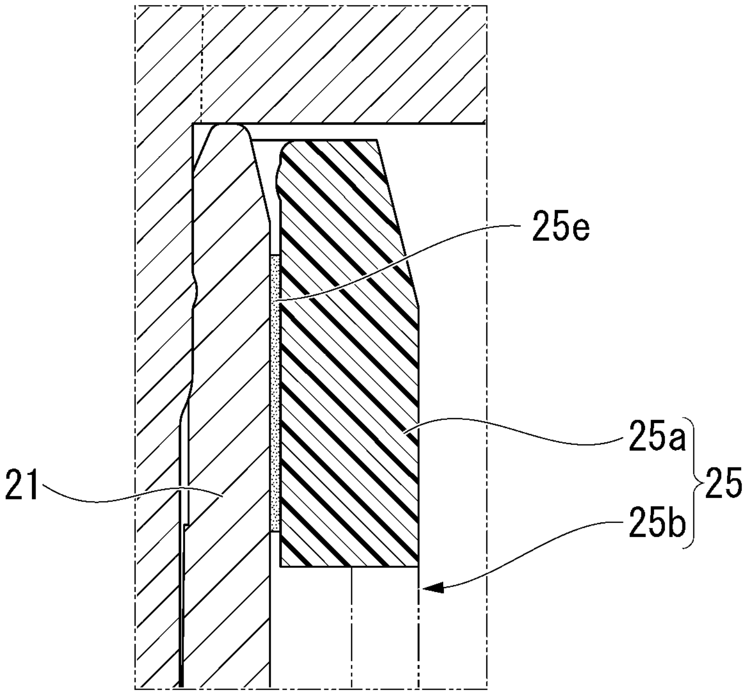
FIG. 5 is a longitudinal cross-sectional view showing a mounting form of a stem and a biasing member according to a first modified example of the present invention.

For example, the form of mounting may be a form using an adhesive layer 25*e* as shown in FIG. 5. In this case, the adhesive layer 25*e* is disposed between the upper end portion of the biasing member 25 and the upper end portion of the stem 21. The adhesive layer 25*e* is made of an adhesive. The biasing member 25 may be mounted on the upper portion of the stem 21 by welding instead of the adhesion.

Figure 6:
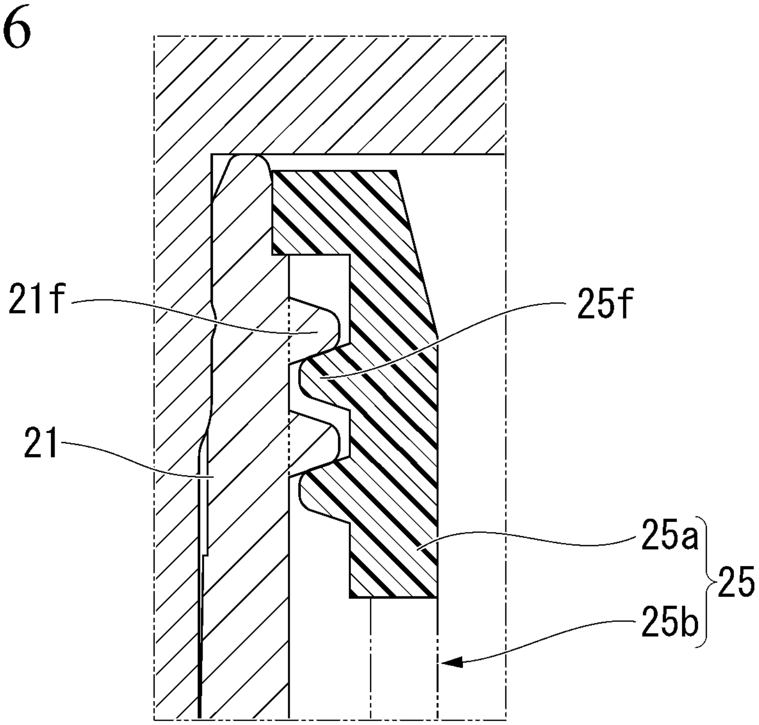
FIG. 6 is a longitudinal cross-sectional view showing a mounting form of a stem and a biasing member according to a second modified example of the present invention.

For example, the form of mounting may be a form using a male thread 21*f* and a female thread 25*f* as shown in FIG. 6. In this case, the male thread 21*f* is provided on the outer peripheral surface of the upper end portion of the stem 21, and the female thread 25*f* is provided on the inner peripheral surface of the upper end portion of the biasing member 25. The male thread 21*f* and the female thread 25*f* are threaded together.

Figure 7:
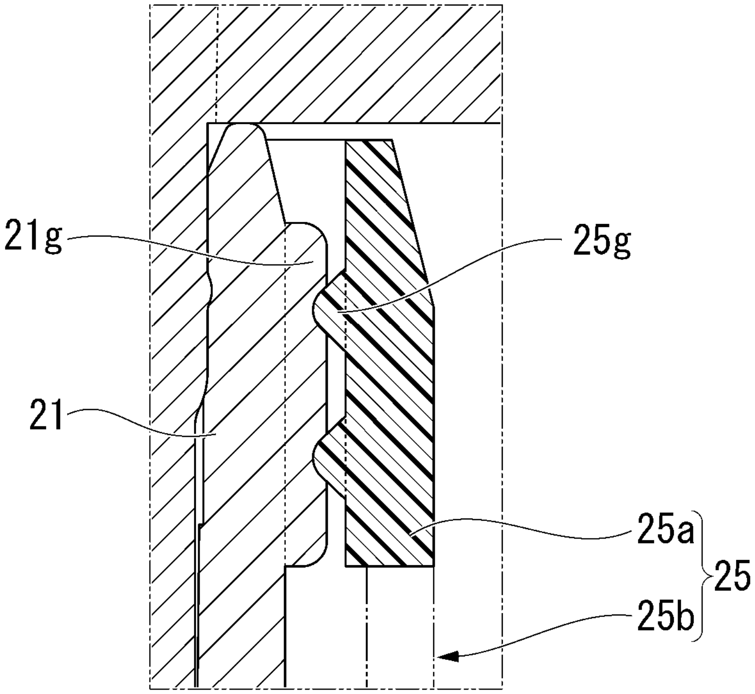
FIG. 7 is a longitudinal cross-sectional view showing a mounting form of a stem and a biasing member according to a third modified example of the present invention.

For example, the form of mounting may be a form using ribs 21*g* and 25*g* as shown in FIG. 7. In this case, the rib 21*g* is provided on the outer peripheral surface of the upper end portion of the stem 21, and the rib 25*g* is provided on the inner peripheral surface of the upper end portion of the biasing member 25. The rib 21*g* is a vertical rib that extends in the vertical direction, and the rib 25*g* is a horizontal rib that extends in the circumferential direction. The ribs 21*g* and 25*g* bite into each other. Thus, the mounting is realized.

Furthermore, in addition to the above-described forms, the form of mounting may be undercut fitting, press-fitting, or the like.

All the parts constituting the discharge devices 1 and 1A need not be made of a synthetic resin.

The pump module 2 may not include the packing 9. For example, the pump module 2 and the packing 9 may be prepared separately, and the packing 9 may be disposed between the pump module 2 and the container body A when the pump module is assembled to the container body A.

In the second embodiment, the biasing member 25 is formed integrally with the piston retainer 41, but in the present invention, the biasing member 25 may be formed integrally with the cylinder 23 in another form. For example, the biasing member 25 may be integrated with the fixed flange portion 29, the peripheral wall of the cylinder 23, or the like.

In addition, it is possible to appropriately replace the constituent elements in the above-described embodiment with well-known constituent elements without departing from the spirit of the present invention, and the modified examples described above may be combined as appropriate.

INDUSTRIAL APPLICABILITY

According to this invention, while the environmental load reduction is carried out, facilitation of disposal by a user is realizable.

REFERENCE SIGNS LIST

1, 1A Discharge device
2 Pump module
5 Push-down head
7 Mounting cap
21 Stem
22 Piston
23 Cylinder
25 Biasing member
41 Piston retainer
A Container body
A1 Mouth portion

The invention claimed is:

1. A discharge device comprising:
- a stem disposed inside a mouth portion of a container body to be movable downward in an upward biased state;
- a cylinder into which the stem is inserted, the cylinder being in a tubular shape with a bottom having an annular bottom wall and a peripheral wall;
- a piston linked to vertical movement of the stem within the cylinder and fitted to an inner peripheral surface of the cylinder to be vertically slidable;
- a biasing member made of a synthetic resin that surrounds the stem from an outside in a radial direction and is mounted on an upper portion of the stem, the biasing member being configured to bias the stem upward; and
- a push-down head mounted on an upper end portion of the stem and provided with a nozzle hole for discharging a content fluid, wherein the piston includes:
- an outer tube;
- an inner tube; and
- a connecting plate connecting an inner peripheral surface of the outer tube and an outer peripheral surface of the inner tube, and extending continuously over an entire length in a circumferential direction, and
- a lower end portion of the stem is capable of coming into contact with an upper surface of the connecting plate at a point between the inner peripheral surface of the outer tube and the outer peripheral surface of the inner tube.

2. The discharge device according to claim 1, wherein at least the stem, the cylinder, the piston and the biasing member constitute a pump module, and
- the push-down head is mounted on the upper end portion of the stem in the pump module.

3. The discharge device according to claim 1, further comprising:
- a piston retainer made of a synthetic resin and provided at an upper end portion of the cylinder, wherein the biasing member is integrally formed with the piston retainer and extends upward from the piston retainer.

4. The discharge device according to claim 2, wherein
- the pump module includes a piston guide,
- the piston guide has a tubular shape with a bottom, and is mounted in the stem from below,
- a communication hole is formed in the piston guide to pass therethrough in the radial direction, and
- the piston is incapable of completely blocking the communication hole in the radial direction.

* * * * *